Patented Mar. 9, 1937

2,073,248

UNITED STATES PATENT OFFICE 2,073,248

PHENOL RECOVERY

Vittorio Molinari, Bound Brook, N. J., assignor to Bakelite Corporation, New York, N. Y., a corporation of Delaware No Drawing. Application June 30, 1936, Serial No. 88,116

9 Claims. (Cl. 260—154)

This invention relates to the extraction of tar acids or phenols from aqueous solutions containing them. Effluent liquors occurring as waste products in various industries, such as the coke industry, contain phenols that noticeably pollute the streams into which the liquors are discharged even when the phenol content is materially less than one per cent. The removal of phenols accordingly is a serious problem and one to which much attention and research has been given.

Among the many methods proposed for dephenolizing waste liquors, those generally adopted depend upon scrubbing the liquors with a phenol solvent as benzol or forming phenolates by means of caustic soda. The separation of the phenols from a benzol solvent solution is usually accomplished by means of caustic soda, for vaporization of benzol has been found to be too costly on account of the amount of steam required and also found ineffective since the phenols are left in the residue in admixture with objectionable impurities. Both methods accordingly depend for recovery of phenols upon caustic soda extraction and subsequent acidification by means of a mineral acid. For acidification sulfuric acid or carbon dioxide is used; but with sulfuric acid both the caustic soda and the acid are wasted, and, while in the case of carbon dioxide the spent carbonate can be recovered by using quick lime for caustification, the recovery requires a large and expensive plant and the cost of regeneration closely approaches the cost of fresh caustic soda.

By the present invention phenols or tar acids are extracted from effluent aqueous liquors without the use of caustic soda and acid; and they are simply and readily obtained in a pure form such as to meet the rigid specifications of synthetic resin manufacture (a typical specification for instance requires less than 0.10% of pyridine and 0.20% of neutral oil and naphthalene). In other words there is so little neutral oil, naphthalenes, pyridine, tarry matter, etc., in the phenols extracted by the process of the present invention that they are commercially fit for resin use without further purification.

The method of extraction followed in the present invention depends upon the principle of solvent extraction of phenols from aqueous solutions containing them, and an improvement over prior art practice lies in the discovery of a solvent or extracting medium which not only has an extracting power many times that of benzol commonly used but also readily gives up the desired phenols in a pure form merely upon heating. No steam distillation therefore is required for the separation of the phenols with consequent contamination by water.

A further discovery utilized in the preferred operation of the present invention is that which depends upon the power of the extracting medium to form emulsions with the effluent liquors. Heretofore the formation of emulsions has been regarded as a serious objection; to the contrary, however, it is now found to be decidedly advantageous in that the intimate contact with tar acids that is thus afforded serves not only in securing a surprisingly complete extraction but also greatly reducing the amount of extracting medium required for the purpose. The successful utilization of the emulsifying power is made possible by the discovery that the emulsions are readily and rapidly broken up by adjusting the pH value whereby a perfectly clear water solution can be separated from the extracting medium.

For the accomplishment of the foregoing results tar acids of high boiling point, and preferably acids boiling materially above those whose separation is desired, are found to be eminently suited. In effluent liquors the acids to be extracted are primarily phenol and some cresols (they are hereinafter referred to as "phenol"); and for the treatment of such liquors the homologs of phenol having a boiling point preferably above the xylenols and comprising the trimethylphenols, tetramethyl-phenols and other monohydroxy phenols or nuclear alkylated or substituted phenols as butyl phenols, phenyl phenols, etc., and monohydroxy derivatives of naphthalene or methyl naphthalenes, etc., alone or in admixture constitute suitable extracting media. In general these acids have a boiling range at or above 230° C., and while they have a very high solvent power for phenol and cresols, their solubility in water is slight. They dissolve or absorb up to 25–30% of their weight of phenol from a dilute water solution, and accordingly a relatively small amount of the extraction medium is necessary in the process.

In the preferred practice of the invention the effluent, or other aqueous solution containing the tar acids to be extracted, is thoroughly mixed with about 5 to 6% of its volume of the extracting medium which consists of high boiling tar acids; the extracting medium has been partially saturated with the acids to be extracted by a preceding washing operation. As the extraction medium now saturated with phenol is substantially insoluble in water, it separates upon standing and can be drawn off. The residual partially dephenolized solution or effluent is again washed with from 5 to 6% of its volume with a fresh extraction medium of high boiling tar acids to remove the remaining tar acids, and after separation this second portion of the extraction medium becomes the first portion for the treatment of the next batch of effluent or solution to be dephenolized. The effluent or solution remaining after the second wash is then sent to waste, though a third wash can be made before it is discarded.

Instead of treating separate batches the process can be carried out conveniently as a continuous process in a scrubbing tower, preferably on the counter current principle whereby the water solution (when of lighter specific gravity) enters the bottom of the tower and the extracting medium enters at the top.

The effluent or waste liquor treated in accordance with the present invention can be ammoniacal liquor formed in the production of coke or producer gas before or after treatment for the recovery of ammonia; by treating ammoniacal liquor before the evaporation of ammonia, the phenol which is carried over with the ammonia (amounting on the average to about 40% of the phenol content) is retained in the solution for extraction. Liquors of his character are usually of lower specific gravity than the extraction medium of high boiling tar acids used for dephenolizing them. Aqueous salt solutions such as the dilute sodium sulfate solution resulting from the acidification of sodium phenolate can also be treated in accordance with this process since it is found that the salt in solution does not interfere with the process; it may, however, have a higher specific gravity with the result that the extraction medium rises to the top instead of settling on the bottom. Sodium sulfate salt solutions from sodium phenate acidification generally contain from 1.5 to 2% of tar acid which is principally phenol, and by the present process it is found that 80 to 85% and more of the phenol content can be removed; the amount of phenol remaining is then so small that the dephenolized liquor can be discharged into streams without creating any difficulties.

As above indicated an extraction medium consisting of high boiling tar acids has the tendency of forming an emulsion with the effluent or solution to be dephenolized; this tendency is accentuated by the presence of impurities such as pyridine bases, tarry materials, sulfur compounds, etc. In the practice of the present invention advantage is taken of this tendency to secure a substantially complete extraction of tar acids with a relatively small amount of extraction medium, for it has been found that the formation of emulsions can be avoided or the emulsions readily broken 1200 gals. of high boiling tar acids having a boiling point ranging from 230° C. to 300° C.; the extraction medium is partially saturated with phenol from its use in the treatment of a preceding batch. The mixture is strongly agitated for about one-half hour and an emulsion forms. The pH value of the solution is then adjusted by the use of a small amount of mineral acid such as sulfuric acid to bring it within the range above stated. The extraction medium which is by this time saturated with phenol settles to the bottom upon standing; it is then drawn off and sent to a still. In the still the dissolved phenol is driven off preferably under a vacuum, and the residual high boiling tar acids are then returned to the cycle to act as a fresh extraction medium. The 20,000 gals. of water solution which have been previously subjected to the first wash are given a second wash with 1000 to 1200 gals. of the fresh extraction medium, which after thorough agitation is allowed to settle and is drawn off to become the first wash for a succeeding batch. The water solution remaining after the second extraction upon analysis shows a phenol content of only 0.10 to 0.15% and less, and this amount is generally unobjectionable; it therefore can be discharged into a stream without creating any trouble. A third wash with a fresh extraction medium materially reduces the amount of phenols remaining in the solution.

The extraction medium, which is drawn off after the first wash and is saturated with phenol, contains from 15 to 20% of water. This is found to be an advantage rather than otherwise for in the distillation process the water is first driven off. In thus passing over, the water carries with it pyridine and other impurities that may be present as set out in my Patent No. 1,909,546 of May 16, 1933. Accordingly it is only necessary to change the receivers when the water fraction has been eliminated in order to collect phenol of a high degree of purity. The practical elimination of phenol is shown by the change in the distillation temperature; under atmospheric pressure phenol comes over at a temperature of 180° C. while under a vacuum (in practice about 11 mm. absolute pressure) it distills over at about 100° C. Enough of higher boiling tar acid constituents can be permitted to vaporize so as to drive phenol out of the fractionating column; by this means a practically complete separation of phenol can be obtained.

The residue which remains in the still includes the high boiling tar acids which form the extraction medium and also any tarry matter which may have been dissolved in the extraction of the water solution; accordingly the phenol distillate is not contaminated with heavy impurities remain in the extraction medium; and second, the water which is carried over with the extraction medium serves to purify the phenol by separating therefrom pyridine, etc., as explained in my patent above mentioned. The separation of the phenol from the extraction medium readily takes place without contamination by the latter on account of the material difference in boiling points, and an important feature therefore of this invention is the separation of the phenol from the extraction medium as a distillate and not as a residue.

Further advantages which follow from the fact that the extraction medium passes through repeated cycles of extraction and distillation, are an increasing solvent power for the phenol and an increasing efficiency of extraction. This arises from the fact that components in the high boiling tar acids which show a relative solubility in water are eliminated in repeating the process of extraction. Another contributing factor is that during the distillation of phenol from the extraction medium there are formed polymerized compounds of the high boiling tar acids which are characterized by higher boiling point and less solubility in water but by an increased solvent power for phenol. The process accordingly becomes more efficient as the cycle is repeated.

The extraction power of high boiling tar acids of phenol from dilute water solutions as hereindescribed is remarkably high. While a liter of benzol will absorb only from 10 to 15 grams of phenol from a dilute water solution, a liter of high boiling tar acids absorbs about 200 grams of phenol from the same water solution. Accordingly only about 5% as much of the tar acid extraction medium is required as of benzol to obtain the same yield of phenol. Furthermore as the tar acids are of the same type as the phenol to be extracted, i. e. they are phenols, no harmful effect generally follows from contamination of the phenol with some of the high boiling tar acids; this is particularly true of resin manufacture, and it is in this field that the extracted phenols find the greatest application. Contamination can, however, be readily avoided by omitting from the extraction medium those tar acids whose boiling point approaches that of the phenol or other acid to be extracted.

What is claimed is:

1. Method of recovering a phenol from an aqueous liquor containing it which comprises subjecting the liquor to extraction with a tar acid of higher boiling point than the phenol in the liquor, separating the tar acid from the aqueous solution, and distilling the phenol from the tar acid.

2. In a method of recovering a phenol from an aqueous liquor containing it, the step which comprises subjecting the liquor to extraction with a tar acid of higher boiling point than the phenol in the liquor.

3. In a method of recovering a phenol from an aqueous liquor containing it, the step which comprises subjecting the liquor to extraction with a tar acid boiling at or above 230° C.

4. In a method of recovering a phenol from an aqueous liquor containing it, the steps which comprise adding to the liquor a tar acid of higher boiling point than the phenol in the liquor, agitating the mixture, and thereafter bringing the pH value of the solution below 3 to break any emulsion formed during the agitation.

5. In a method of recovering a phenol from an aqueous liquor containing it, the steps which comprise mixing the liquor with a tar acid of higher boiling point than the phenol in the liquor, and bringing the pH value of the solution below 3.

6. In a method of recovering a phenol from an aqueous liquor containing it, the steps which comprise mixing the liquor with a tar acid of higher boiling point than the phenol in the liquor, and bringing the pH value of the solution within a range of 1 to 2.5.

7. In a method of recovering a phenol from an aqueous liquor containing it, the steps which comprise mixing the liquor with a tar acid of higher boiling point than the phenol in the liquor, and bringing the pH value of the solution within a range of 1.5 to 1.8.

8. In a method of recovering a phenol from an aqueous liquor containing it the steps which comprise extracting the liquor with a tar acid of higher boiling point than the phenol, distilling the extracted phenol from the tar acid, and returning the residue for a repetition of the extraction cycle.

9. In a method of recovering a phenol from an aqueous liquor containing it by means of extraction with a tar acid of higher boiling point than the phenol, the steps which comprise distilling the tar acid extraction, and collecting the water fraction that first comes over separately from the phenol fraction.

VITTORIO MOLINARI.